United States Patent
Thiebes et al.

(10) Patent No.: US 12,241,001 B2
(45) Date of Patent: Mar. 4, 2025

(54) SYSTEMS FOR PRIMING AND ADHESION OF FLOORING

(71) Applicant: Covestro Deutschland AG, Leverkusen (DE)

(72) Inventors: Christoph Thiebes, Cologne (DE); Karl H. Wuehrer, Cologne (DE); Ute Nattke, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 498 days.

(21) Appl. No.: 16/758,079

(22) PCT Filed: Nov. 19, 2018

(86) PCT No.: PCT/EP2018/081787
§ 371 (c)(1),
(2) Date: Apr. 22, 2020

(87) PCT Pub. No.: WO2019/101690
PCT Pub. Date: May 31, 2019

(65) Prior Publication Data
US 2021/0024796 A1 Jan. 28, 2021

(30) Foreign Application Priority Data
Nov. 22, 2017 (EP) .................................. 17202962

(51) Int. Cl.
| C09J 175/12 | (2006.01) |
| C08G 18/10 | (2006.01) |
| C08G 18/32 | (2006.01) |
| C08G 18/60 | (2006.01) |
| C08G 18/75 | (2006.01) |
| C09J 5/02 | (2006.01) |

(52) U.S. Cl.
CPC ............ *C09J 175/12* (2013.01); *C08G 18/10* (2013.01); *C08G 18/3206* (2013.01); *C08G 18/603* (2013.01); *C08G 18/755* (2013.01); *C09J 5/02* (2013.01); *C09J 2475/00* (2013.01)

(58) Field of Classification Search
CPC ........ C09J 175/12; C09J 5/02; C09J 2475/00; C09J 2475/003; C09J 2203/314; C09J 2483/00; C08G 18/10; C08G 18/3206; C08G 18/603; C08G 18/755; C08G 18/3821; C08G 18/792; C09D 175/02
See application file for complete search history.

(56) References Cited

U.S. PATENT DOCUMENTS

| 5,126,170 | A | 6/1992 | Zwiener et al. |
| 5,214,086 | A | 5/1993 | Mormile et al. |
| 5,243,012 | A | 9/1993 | Wicks et al. |
| 5,364,955 | A | 11/1994 | Zwiener et al. |
| 5,412,056 | A | 5/1995 | Zwiener et al. |
| 5,489,704 | A | 2/1996 | Squiller et al. |
| 5,559,204 | A | 9/1996 | Squiller et al. |
| 5,623,045 | A | 4/1997 | Zwiener et al. |
| 6,458,293 | B1 | 10/2002 | Roesler et al. |
| 6,590,066 | B1 | 7/2003 | Roesler |
| 6,605,684 | B2 | 8/2003 | Primeaux, II et al. |
| 6,790,925 | B2 | 9/2004 | Danielmeier et al. |
| 8,012,302 | B2 | 9/2011 | Jucker et al. |
| 8,399,102 | B2 | 3/2013 | Oertli et al. |
| 9,334,433 | B2 | 5/2016 | Oertli et al. |
| 9,944,821 | B2 | 4/2018 | Squiller et al. |
| 2004/0067315 | A1 | 4/2004 | Niesten et al. |
| 2006/0247371 | A1* | 11/2006 | Mundstock .......... C08G 18/775 524/589 |
| 2007/0066786 | A1 | 3/2007 | Hanson, Jr. et al. |
| 2015/0140330 | A1 | 5/2015 | Tanaka et al. |
| 2017/0240780 | A1* | 8/2017 | Kramer ................. C07F 7/1804 |

FOREIGN PATENT DOCUMENTS

| CA | 2588238 A1 * | 6/2006 | |
| CN | 107337993 A * | 11/2017 | |
| DE | 19701835 A1 | 7/1998 | |
| DE | 102006002153 A1 | 7/2007 | |
| DE | 202010017391 U1 * | 11/2011 | ............ B23B 41/02 |
| EP | 0667362 A1 | 8/1995 | |
| EP | 0893458 A1 | 1/1999 | |
| EP | 3098247 A1 | 11/2016 | |
| JP | 2008101453 A | 5/2008 | |
| JP | 2010084128 A | 4/2010 | |
| JP | 2017511397 A * | 4/2017 | |
| JP | 2017080909 A | 5/2017 | |
| WO | WO 0107399 A1 | 2/2001 | |
| WO | WO 2014138052 A1 * | 9/2014 | |

OTHER PUBLICATIONS

Kaneka; Innovative Polymers for Sealing and Bonding Future Buildings, 2018, p. 1-18.*
Kaneka; Kaneka MS Polymer®: Your Premium Polymer of Choice, 2019, p. 1-15.*
10-page brochure for the S203H from MS Polymers by SpecialChem (Copyrighted 2023).*
International Search Report, PCT/EP2018/081787, date of mailing: Jan. 7, 2019, Authorized officer: Stefan Meier.
Houben Weyl, Meth. d. Org. Chemie vol. 11/1, 272 (1957).
Usp. Khim. 1969, 38, 1933.

* cited by examiner

*Primary Examiner* — Tae H Yoon
(74) *Attorney, Agent, or Firm* — The Webb Law Firm

(57) ABSTRACT

The invention relates to layer structures containing polyaspartic primers (AG) and curable compositions based on silane-modified polymers (KS), and to a method for adhesion of flooring onto pre-treated substructures.

8 Claims, No Drawings

SYSTEMS FOR PRIMING AND ADHESION OF FLOORING

CROSS-REFERENCE TO RELATED APPLICATION

This application is a national stage application under 35 U.S.C. § 371 of PCT/EP2018/081787, filed Nov. 19, 2018, which claims the benefit of European Application No. 17202962, filed Nov. 22, 2017, each of which is incorporated herein by reference.

FIELD

The present invention relates to layer structures comprising polyaspartate primers (AG) and curable compositions based on silane-modified polymers (KS) and also to a method for adhesively bonding floor coverings on pretreated substrates.

BACKGROUND

It is in many cases advantageous and necessary to carry out adhesive bonding of floor coverings such as parquet, cork, rubber, PVC sheets, and tiles, and also linoleum to construction substrates such as screeds or wooden surfaces.

In cases of particular exposures (temperature and humidity) or of highly dimensionally unstable floor coverings (e.g. solid boards), there is a preference for using reactive adhesives, examples being moisture-curing adhesives based on polyurethane prepolymers.

A relatively recent development suitable for this use are adhesives based on silane-modified oligomeric compounds, known as SMP adhesives (silane-modified polymer adhesives, occasionally also called hybrid adhesives or silane-terminated polymer adhesives). These adhesives are characterized by oligomeric organic compounds (often also called prepolymers) which carry moisture-reactive silane groups, usually dimethoxymethyl or trimethoxysilane groups. Silane-modified polymers (SMPs) can be obtained very easily from polyurethane polymers containing isocyanate groups, by refunctionalization of their isocyanate groups into silane groups, using amino-, thio- or hydroxysilanes. Silane-modified polymers which are free of urea groups and contain few if any urethane groups are likewise known and are accessible for example through reaction of polyether polyols with isocyanatosilanes or by hydrosilylation of allyl-functional polyethers. Silane-modified polymers modified with silane groups at each end of the polymer backbone are also called silane-terminated polymers (STPs). After contact with moisture from the substrate or the air, the moisture-reactive silane groups crosslink through hydrolysis and subsequent condensation to form a three-dimensional siloxane network, the adhesive matrix.

Other constituents of these adhesives are liquid extenders, plasticizers, mineral fillers, water scavengers, adhesion promoters, catalysts, and further auxiliaries. For the bonding of floor coverings, adhesives based on silane-modified polymers have in general the following advantages: one-component system; absence of water and solvents; adequately long open times; no realistically relevant effect of wood swelling; free from labeling requirements under German hazardous substances regulations and the international GHS labeling system. A further advantage is the pseudoplastic rheology of SMP adhesives. What this means in practice is that the adhesives do not run and can be applied effectively using a notched trowel. Beads of drawn adhesive remain dimensionally stable and so provide an important precondition for bridging relatively small voids between floor covering and substrate.

Silane-modified polymer adhesives typically comprise plasticizers and/or nonreactive liquid extenders, which lower the viscosity of the adhesive and guarantee necessary working properties. They are, however, unfortunately also responsible for a series of performance-related problems and limitations. The dissolution properties of these migratable liquids have the particular effect of starting to dissolve a mastic asphalt substrate, which must therefore be primed using plasticizer-containing, silane-modified polymer adhesives before a floor covering is bonded.

The primer must in this case have sufficient plasticizer resistance—that is, it must not be partially dissolved by the plasticizer from the adhesive, which would reduce its strength, and there must be no migration of the plasticizer through the primer into the mastic asphalt.

Dispersion-based primers used typically as a primer for developing adhesion and for binding dust, these primers being based on vinyl acetate-ethylene, styrene-acrylate or acrylic ester copolymers, are not resistant to plasticizers. With silane-modified adhesives, therefore, adhesion problems must in principle be expected, especially if they comprise migrating constituents.

Another key factor in flooring technology and in principle when covering cementitious substrates is the moisture content of the substrate. For reasons, for example, of too short a drying time or else a permanent source of moisture beneath the substrate, such substrates may have a high moisture content. Examples of substrates of these kinds are concrete, cement, screeds or self-leveling cement screeds. Applying a flooring construction or covering such a substrate with further materials, without damage, can be accomplished here only if the water content of the substrate is in equilibrium with the average ambient conditions (equilibrium moisture content of the material). If this equilibrium condition has not yet been reached at the time of the further construction of the flooring, because of too short a drying time, or if there is a permanent moisture source beneath the substrate, the long-term establishment of an equilibrium moisture content is accompanied by diffusion of water vapor from the substrate and into the ambient air. This causes no problem as long as the substrate is not covered over with a floor covering or only layers with a very low water vapor diffusion resistance are applied. With the majority of flooring constructions, however, a number of layers are installed, such as, for example, primers, troweling compounds, adhesives, films, floor coverings such as parquet, and ultimately surface treatment compositions as well, each of these possessing water vapor diffusion resistance levels which in some cases are very high. With multiple-layer constructions, the layer sequence must then be selected in such a way that the water vapor diffusion resistance of the individual layers decreases in line with their distance from the moisture source.

With the typical structures and layer sequences in flooring technology, what this means in actual practice is that, on a substrate having an increased moisture content which is not in its equilibrium state, the diffusion rate of water vapor from the substrate through a primer having water vapor diffusion-braking properties (water vapor diffusion brake) must be lower than the water vapor diffusion rate through the top covering on the primer.

To solve this physical construction problem, the prior art uses specific water vapor braking primers with a variety of raw materials as their basis. Such water vapor braking primers, however, may be applied only to cementitious substrates, such as cement screeds, self-leveling cement screeds or concretes, owing to their hydraulic properties and their water resistance.

The most widespread primers are two-component epoxy resin primers (EP primers, e.g. Stauf VEP-190), the resin component of which consists in general of low molecular mass Bisphenol A/F resin mixtures with low-viscosity aliphatic glycidyl ethers as reactive diluent, and whose curing component consists of a polyamine/polyamide mixture. These epoxy resin primers may be solvent-free or solvent-borne and are distinguished by effective penetration into the substrate and, as two-component materials, by reliable hardening through chemical reaction in a large spectrum of working circumstances. A performance disadvantage of epoxy resin primers is that adhesion on the fully cured primer is very difficult to achieve. The further components of the floor structure, such as intermediate primers, different types of adhesive, or mineral troweling compounds, do not achieve adequate adhesion on a cured EP primer. In order to ensure adequate adhesion, the EP primer has to be applied in two layers, and the second layer then strewn with large quantities of silica sand. After curing is complete, about half of the sand strewn in excess has to be removed and disposed of. The further layers then adhere primarily to the surface of the grains of sand protruding from the epoxy resin surface. It is found, moreover, that many of these primers do not have the necessary plasticizer resistance, and, moreover, that it is necessary to wait, or wait for drying, for up to 24 h before applying adhesives.

Some aqueous 2-component epoxy resin primers possess significantly lower drying times or waiting times, in the region of a few hours. When they are used, however, additional water is carried into the substrate, and is a disadvantage for reasons stated above. In extreme weather situations (high atmospheric humidity) and in inadequate ventilation, moreover, the waiting time may be prolonged owing to slow evaporation of the water.

The prior art additionally includes polyurethane primers, which in general are one-component (1 K) systems and are based on diphenylmethane diisocyanate prepolymers (MDI) (e.g., Stauf VPU-155). These primers possess outstanding plasticizer resistance. A great disadvantage, however, is that the curing reactions and hence also the ultimate state of the polymer film which forms are heavily dependent on the ambient conditions, especially the room temperature, the relative room atmospheric humidity, the substrate temperature, and the water content of the substrate. One problem which arises here is the difference in evolution of $CO_2$ during the curing reactions, leading to a porous polymer film, with impairment both of the mechanical and of the water vapor diffusion-braking properties. Because of the layer thickness-dependent tendency toward foaming as a result of evolution of $CO_2$, it is necessary to apply the layer thicknesses that are needed for an effective barrier toward moisture or migration of plasticizer in two operations, and after the last operation it is generally necessary to observe waiting times of at least 12 h before the application of adhesives, especially of SMP adhesives.

SUMMARY

It is an object of the present invention, therefore, to discover systems composed of primer and adhesive for the bonding of wood, cork, linoleum, rubber, and/or PVB floors onto construction substrates such as screeds, tiles or wooden surfaces, and also a method for using this system composed of primer and adhesive for the bonding of wood, cork, linoleum, rubber and/or PVC floors on construction substrates such as, for example, screeds or wooden surfaces, which method does not have the disadvantages known in the prior art, such as, for example, inappropriate plasticizer resistance and/or unsuitable water vapor diffusion rate of the primer, long waiting times for the curing of the primer, multiple application of the primer.

Surprisingly it has been possible within the context of the present invention to show that a layer structure consisting of polyaspartate primer (AG) and curable compositions based on silane-modified polymers (KS) are outstandingly suitable for the adhesive bonding of wood, cork, linoleum, rubber and/or PVC floors to construction substrates such as screeds or wooden surfaces, for example, and do not have the disadvantages described in the prior art, such as, for example, inappropriate plasticizer resistance and/or water vapor diffusion rate of the primer, long waiting times for curing of the primer before application of adhesive, multiple application of the primer.

The object of the present invention has therefore been achieved through the layer structure of polyaspartate primers (AG) and curable compositions based on silane-modified polymers (KS).

DETAILED DESCRIPTION

A "composition" is understood in the context of the present invention to be a mixture of at least two ingredients.

The term "curable" is to be understood to mean that the composition, under the influence of external conditions, especially under the influence of moisture present in the environment and/or deliberately supplied, is able to transition from a relatively soft, possibly plastically deformable state into a harder state. The crosslinking may in general take place through chemical and/or physical influences; as well as the moisture already mentioned, then, also, for example, through supply of energy in the form of heat, light or other electromagnetic radiation, or else by simple contacting of the composition with air or with a reactive component.

In the context of the present invention, the layer structure of polyaspartate primer (AG) and composition based on silane-modified polymers (KS), the composition (KS) comprises the following, silane-modified polymers having at least one end group of the general formula (I)

in which
A is a divalent linking group comprising at least one heteroatom,
R is a divalent hydrocarbon radical having 1-12 carbon atoms,
V, Y, and Z are substituents on the Si atom, and independently of one another are $C_1$-$C_8$ alkyl, $C_1$-$C_8$ alkoxy or $C_1$-$C_8$ acyloxy groups, where at least one of the radicals V, Y, and Z is a $C_1$-$C_8$ alkoxy or $C_1$-$C_8$ acyloxy group, and
n is 0 or 1.

The above-silane-modified polymer having at least one end group of the general formula (I) is preferably a polyether or a poly(meth)acrylic ester.

A polyether is a polymer whose organic repeating units comprise ether functionalities (—C—O—C—) in the main chain. Not included among the polyethers, therefore, are polymers having pendant ether groups, as for example the cellulose ethers, starch ethers, and vinyl ether polymers. Polyacetals as well such as polyoxymethylene (POM) are generally not counted among the polyethers.

A poly(meth)acrylic ester is a polymer which is based on (meth)acrylic esters and which therefore has as a repeating unit the structural motif

, in which

R$^a$ stands for a hydrogen atom (acrylic esters) or for a methyl group (methacrylic esters), and
R$^b$ stands for linear, branched and/or cyclic alkyl radials and/or else alkyl radicals comprising functional substituents—for example, for methyl, ethyl, isopropyl, cyclohexyl, 2-ethylhexyl or 2-hydroxyethyl radicals.

With particular preference in the context of the invention, the above-silane-modified polymer having at least one end group of the general formula (I) is a polyether. Polyethers have a flexible and elastic structure, with which compositions can be produced which exhibit outstanding elastic properties. Polyethers in this context are not only flexible in their parent structure, but also resistant at the same time. For example, polyethers are not decomposed or attacked by water and bacteria, in contrast to polyesters, for instance.

The number-average molecular weight $M_n$ of the polyether forming the basis for the above-silane-modified polymer having at least one end group of the general formula (I) is preferably 2000 to 100 000 g/mol (daltons), the molecular weight more preferably being at least 6000 g/mol and more particularly being at least 8000 g/mol. Number-average molecular weights of at least 2000 g/mol are advantageous for the polyethers in the context of the present invention, since compositions (KS) of the invention that are based on polyethers having such a minimum molecular weight exhibit significant film-forming properties. For example, the number-average molecular weight $M_n$ of the polyether is 4000 to 100 000, preferably 8000 to 50 000, more preferably 10 000 to 30 000, especially 17 000 to 27 000 g/mol. These molecular weights are particularly advantageous because the corresponding compositions (KS) exhibit a good balance of viscosity (ready workability), strength, and elasticity. This combination is pronounced to particularly advantageous effect within a molecular weight range from 18 000 to 26 000, especially of 20 000 to 24 000 g/mol.

Particularly advantageous viscoelastic properties can be achieved by using polyethers which possess a narrow molar mass distribution and hence a low polydispersity. They are preparable, for example, by what is known as double metal cyanide catalysis (DMC catalysis). Polyethers prepared in this way are notable for a particularly narrow molar mass distribution, for a high average molar mass, and for a very low number of double bonds at the ends of the polymer chains.

The maximum polydispersity $M_w/M_n$ of the polyether forming the basis for the above-silane-modified polymer having at least one end group of the general formula (I) is therefore preferably 3, more preferably 1.7, and very preferably 1.5.

The molecular weight $M_n$ refers to the number-average molecular weight of the polymer. It is determined, like the weight-average molecular weight $M_w$ as well, by gel permeation chromatography (GPC, alternatively: SEC) using polystyrene standard and tetrahydrofuran as eluent. This technique is known to the skilled person. The polydispersity is derived from the average molecular weights $M_w$ and $M_n$. It is calculated as PD=$M_w/M_n$. The $M_w/M_n$ ratio (polydispersity) indicates the breadth of the molar mass distribution and hence of the different degrees of polymerization of the individual chains in the case of polydisperse polymers. For many chain growth addition polymers and polycondensates, the value of the polydispersity is about 2. Strict monodispersity would exist at a value of 1. A low polydispersity of less than 1.5, for example, is indicative of a comparatively narrow molecular weight distribution and hence of the specific expression of properties which correlate with the molecular weight, such as the viscosity, for example. In particular, therefore, in the context of the present invention, the polyether forming the basis for the above-silane-modified polymer having at least one end group of the general formula (I) has a polydispersity ($M_w/M_n$) of less than 1.3.

A divalent or bivalent linking group A comprising at least one heteroatom refers to a divalent chemical group which links the polymer scaffold of the alkoxysilane- and/or acyloxy-silane-terminated polymer to the radical R of the end group. The divalent linking group A may be formed, for example, during the preparation of the alkoxysilane- and/or acyloxy-silane-terminated polymer, in the form of an amide or urethane group, for example, through the reaction of an isocyanatosilane with a polyether that is functionalized with hydroxyl groups. In this case the divalent linking group may both be distinguishable and also indistinguishable from structural features which occur in the parent polymer scaffold. They are indistinguishable, for example, if the group is identical to the linkage points of the repeating units of the polymer scaffold.

The index "n" correspond to 0 (zero) or 1, meaning that the divalent linking group A links the parent polymer structure to the radical R (n=1), or the polymer scaffold is directly connected or linked (n=0) to the radical R.

The divalent linking group A in the general formula (I) is preferably an oxygen atom or a group —NR'—, in which R' is an H atom or an alkyl or aryl radical having 1 to 12 C atoms, or the divalent linking group A comprises an amide, carbamate, urea, imino, carboxylate, carbamoyl, amidino, carbonate, sulfonate or sulfinate group.

Particularly preferred as linking group A are urethane and urea groups, which may be obtained by reaction of certain functional groups of a prepolymer with an organosilane which carries a further functional group. Urethane groups, for example, may form if either the polymer scaffold contains terminal hydroxyl groups and isocyanatosilanes are used as a further component, or if, conversely, a polymer which has terminal isocyanate groups is reacted with an alkoxysilane containing terminal hydroxyl groups. In a similar way, urea groups may be obtained if a terminal primary or secondary amino group—on the silane or on the polymer—is used, which reacts with a terminal isocyanate group present in the respective coreactant. This means that either an aminosilane is reacted with a polymer containing terminal isocyanate groups, or a polymer substituted terminally by an amino group is reacted with an isocyanatosilane.

Urethane and urea groups advantageously raise the strength of the polymer chains and of the crosslinked polymer as a whole.

The radical R is a divalent hydrocarbon radical having 1 to 12 C atoms. The hydrocarbon radical may be a straight-chain, branched or cyclic alkylene radical. The hydrocarbon radical may be saturated or unsaturated. R is preferably a divalent hydrocarbon radical having 1 to 6 C atoms. Via the length of the hydrocarbon radicals which form the linking element, or one of the linking elements, between polymer scaffold and silyl radical, it is possible to influence the rate of cure of the composition. With particular preference R is a methylene, ethylene or n-propylene group, especially a methylene or n-propylene radical. Alkoxysilane-terminated compounds having a methylene group as the linking element to the polymer scaffold—known as α-silanes—have particularly high reactivity on the part of the concluding silyl group, leading to shortened setting times and hence to very rapid curing of formulations based on such polymers.

Generally speaking, increasing the length of the connecting hydrocarbon chain results in reduced reactivity on the part of the polymers. Especially the γ-silanes—they contain the unbranched propylene radical as linking element—exhibit a good balance between required reactivity (acceptable cure times) and retarded curing (open time, possibility for correction after bonding has taken place). Through a deliberate combination of α- and γ-alkoxysilane-terminated building blocks, therefore, it is possible to exert influence as desired over the cure rate of the systems. The substituents V, Y, and Z which are connected directly to the Si atom are, independently of one another, $C_1$-$C_8$-alkyl radicals, $C_1$-$C_8$-alkoxy radicals or $C_1$-$C_8$-acyloxy radicals. At least one of these radicals V, Y, and Z must be a hydrolyzable group, in other words a $C_1$-$C_8$-alkoxy radical or a $C_1$-$C_8$-acyloxy radical. Hydrolyzable groups chosen are preferably alkoxy groups, especially methoxy, ethoxy, isopropyloxy, and isobutyloxy groups. This is advantageous since the curing of compositions containing alkoxy groups is not accompanied by any release of nucleous membrane irritants. The alcohols formed by hydrolysis of the radicals are unobjectionable in the amounts released, and evaporate. Accordingly, such compositions are suitable especially for the home improvement sector. Other hydrolyzable groups which can be used, however, include acyloxy groups, such as an acetoxy group —O—CO—CH$_3$, for example.

The alkoxysilane- and/or acyloxysilane-terminated polymer or polymers preferably has or have at least two end groups of the general formula (I). Each polymer chain therefore contains at least two linkage sites at which the condensation of the polymers can take place in the presence of atmospheric moisture, with elimination of the hydrolyzed radicals. In this way a regular and rapid crosslinkability is achieved, allowing bonds with high strengths to be obtained. Furthermore, via the amount and the structure of the hydrolyzable groups—for example, through use of di- or trialkoxysilyl groups, methoxy groups or longer radicals—it is possible to control the architecture of the obtainable network as a long-chain system (thermoplastics), relatively wide-meshed three-dimensional network (elastomers) or highly crosslinked system (thermosets), hence allowing influence over qualities including the elasticity, the flexibility, and the heat resistance of the fully crosslinked compositions.

Polymers which contain di- and/or trialkoxysilyl groups generally possess highly reactive linking sites, which permit rapid curing, high degrees of crosslinking, and therefore good ultimate strengths. The particular advantage of dialkoxysilyl groups is that the compositions in question, after curing, are more elastic, more pliant, and more flexible than systems containing trialkoxysilyl groups. They are therefore especially suitable for application as sealants. Furthermore, they give off less alcohol on curing and are therefore of particular interest when the aim is to reduce the amount of alcohol released.

With trialkoxysilyl groups, conversely, a high degree of crosslinking is achievable, this being particularly advantageous if the desire after curing is for a relatively hard, relatively firm material. Furthermore, trialkoxysilyl groups are more reactive, and hence they crosslink more rapidly and so reduce the amount of catalyst required, and they have advantages in terms of "cold flow"—the dimensional stability of a corresponding adhesive under the influence of exposure to force and possibly temperature.

More preferably the radicals V, Y, and Z in the general formula (I), in each case independently of one another, are a methyl, an ethyl, a methoxy or an ethoxy group, with at least one of the radicals being a methoxy or ethoxy group. Methoxy and ethoxy groups, as comparatively small hydrolyzable groups with little steric bulk, are highly reactive and so permit rapid curing even with a low level of catalyst use. They are therefore of interest especially for systems for which rapid curing is desired, as in the case of adhesives which are to have high initial adhesion, for example.

More preferably V, Y, and Z, in each case independently of one another, are a methyl or a methoxy group, with at least one of the radicals being a methoxy group. Depending on the nature of the alkyl radicals on the oxygen atom, compounds having alkoxysilyl groups exhibit differences in reactivity in chemical reactions. Here, within the alkoxy groups, it is the methoxy group that has the greatest reactivity. Such silyl groups can therefore be employed when particularly rapid curing is desired. In comparison to methoxy groups, higher aliphatic radicals such as ethoxy result in lower reactivity of the terminal alkoxysilyl group and can be used advantageously in order to impart graded rates of crosslinking.

Likewise more preferably, V is an alkyl group and Y and Z, each independently of one another, are an alkoxy group, or V, Y, and Z, in each case independently of one another, are an alkoxy group.

Interesting design possibilities are also opened up by combinations of both groups. If, for example, methoxy for V and ethoxy for Y is selected within the same alkoxysilyl group, the desired reactivity of the concluding silyl groups can be particularly finely tuned, if silyl groups carrying exclusively methoxy groups are perceived as too reactive, and the silyl groups carrying ethoxy groups as too slow, for the intended utility.

Besides methoxy and ethoxy groups, it is of course also possible to use larger radicals as hydrolyzable groups, which exhibit, naturally, a lower reactivity. This is of interest especially when delayed curing is to be achieved by way of the configuration of the alkoxy groups as well.

Mention may further be made of commercially available silane-modified polymers, especially products under the tradenames MS Polymer™ (from Kaneka Corp.; especially products S203H, S303H, S227, S810, MA903 or S943); MS Polymer™ or Silyl™ (from Kaneka Corp.; especially the products SAT010, SAT030, SAT200, SAX350, SAX400, SAX725, MAX450, MAX602 or MAX951); Excestar® (from Asahi Glass Co. Ltd.; especially the products S2410, S2420, S3430 or S3630); SPUR+* (from Momentive Performance Materials; especially the products 1015LM or 1050MM); Vorasil™ (from Dow Chemical Co.; especially the products 602 or 604); Desmoseal® S (from Covestro Deutschland AG; especially the products S XP 2458, S XP 2636, S XP 2749, S XP 2774 or S XP 2821); TEGOPAC® (from Evonik Industries AG; especially the products Seal 100, Bond 150 or Bond 250); or Geniosil® STP (from Wacker Chemie AG; especially the products E15, E35, E10, E30).

The proportion of the total amount of the above-silane-modified polymer having at least one end group of the general formula (I) in the composition based on silane-modified polymers (KS) is preferably 5 to 75 percent by weight, more preferably 10 to 50 percent by weight, as for example 12 to 35 percent by weight, more particularly 15 to 25 percent by weight, based in each case on the total weight of the composition (KS).

Moreover, the compositions based on silane-modified polymers (KS) may additionally comprise further constituents such as, for example, plasticizers, catalysts, fillers, reactive diluents, drying agents and adhesion promoters, and also auxiliaries.

The plasticizer is preferably selected from cyclohexanedicarboxylic acid dialkyl ester wherein the alkyl radicals in the ester groups independently of one another each contain 1 to 20 C atoms, preferably cyclohexane-1,2-dicarboxylic acid diisononyl ester, also called diisononyl cyclohexane-1,2-dicarboxylate (DINCH), another dicarboxylic ester, fatty acid ester, an ester of OH-group-bearing or epoxidized fatty acids, a fat, a glycolic ester, a benzoic ester, a phosphoric ester, a sulfonic ester, a trimellitic ester, an epoxidized plasticizer, a polyether plasticizer, a polystyrene, a hydrocarbon plasticizer, and a chlorinated paraffin, and also mixtures of two or more thereof. Through the targeted selection of one of these plasticizers or of a specific combination, it is possible to realize further advantageous properties of the composition of the invention—for example, gelling capacity of the polymers, low-temperature elasticity or low-temperature stability, or else antistatic properties.

Of the polyether plasticizers, preference is given to using endgroup-capped polyethylene glycols, examples being polyethylene or polypropylene glycol di-$C_1$-$C_4$ alkyl ethers, especially the dimethyl or diethyl ethers of diethylene glycol or dipropylene glycol, and also mixtures of two or more thereof. Likewise suitable as plasticizers are, for example, esters of abietic acid, butyric esters, acetic esters, propionic esters, thiobutyric esters, citric esters, and also nitrocellulose-based and polyvinyl acetate-based esters, and also mixtures of two or more thereof. Also suitable, for example, are the asymmetric esters of monooctyl adipate with 2-ethylhexanol (Edenol DOA, Cognis Deutschland GmbH, Dusseldorf). Additionally suitable as plasticizers are the pure or mixed ethers of monofunctional, linear or branched $C_4$-$C_6$ alcohols or mixtures of two or more different ethers of such alcohols, examples being dioctyl ethers (available as Cetiol OE, Cognis Deutschland GmbH, Dusseldorf). Likewise suitable as plasticizers in the context of the present invention are diurethanes, which are preparable, for example, by reacting diols having OH endgroups with monofunctional isocyanates, selecting the stoichiometry such that substantially all of the free OH groups are consumed by reaction. Any excess isocyanate can be subsequently removed from the reaction mixture by distillation, for example. Another method for preparing diurethanes is the reaction of monofunctional alcohols with diisocyanates, with as far as possible all of the NCO groups being consumed by reaction.

In principle phthalic esters as well can be used as plasticizers, but are not preferred, owing to their toxicological potential.

If the compositions based on silane-modified polymers (KS) have a viscosity which is too high for certain applications, a further possibility is to use a reactive diluent to reduce this viscosity in a simple and convenient way without any separation phenomena (for example, plasticizer migration) occurring in the cured material. The reactive diluent preferably has at least one functional group which after application reacts, for example, with moisture or atmospheric oxygen. Examples of such groups are silyl groups, isocyanate groups, vinylically unsaturated groups, and polyunsaturated systems. Reactive diluents which can be employed are all compounds which are miscible with the composition based on silane-modified polymers (KS), with reduction in viscosity, and which possess at least one group which is reactive with the binder; these reactive diluents can be used alone or as a combination of two or more compounds. The viscosity of the reactive diluent is preferably less than 20 000 mPas, more preferably about 0.1-6000 mPas, very preferably 1-1000 mPas (Brookfield RVT, 23° C., spindle 7, 10 rpm/min).

The following substances, for example, may be used as reactive diluents: polyalkylene glycols reacted with isocyanatosilanes (for example, Synalox 100-50B, DOW), or alkyltrimethoxysilane, alkyltriethoxysilane, such as methyltrimethoxysilane, methyltriethoxysilane, and also vinyltrimethoxysilane (XL 10, Wacker), phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methylcarbamate (XL63, Wacker), N-dimethoxy(methyl)silylmethyl-O-methyl-carbamate (XL65, Wacker), hexadecyltrimethoxysilane, 3-octanoylthio-1-propyltriethoxysilane, and partial hydrolyzates of these compounds. Likewise possible for use, furthermore, are the following polymers from Kaneka Corp. as reactive diluents: MS S203H, MS S303H, MS SAT 010, and MS SAX 350.

Additionally suitable as reactive diluents are polymers which are preparable from an organic parent structure by grafting with a vinylsilane or by reaction of polyol, polyisocyanate, and alkoxysilane.

A polyol is a compound which in the molecule contains one or more OH groups. The OH groups may be primary and secondary.

The suitable aliphatic alcohols include, for example, ethylene glycol, propylene glycol, and higher glycols, and also other polyfunctional alcohols. The polyols may additionally comprise further functional groups such as, for example, esters, carbonates, amides.

To prepare a reactive diluent by reaction of polyol with polyisocyanate and alkoxysilane, the corresponding polyol component is reacted in each case with an at least difunctional isocyanate. An at least difunctional isocyanate is in principle any isocyanate having at least two isocyanate groups, though in general, for compositions based on silane-modified polymers (KS), preference is given to compounds having two to four isocyanate groups, especially having two isocyanates groups.

Preferred among the alkoxysilyl groups are the di- and trialkoxysilyl groups. Examples of polyisocyanates suitable for preparing a reactive diluent are ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis(2-isocyanatoethyl) fumarate, and also mixtures of two or more thereof, 1-isocyanato-3,3,5-trimethyl-5-isocyanatomethylcyclohexane (isophorone diisocyanate, IPDI), 2,4- and 2,6-hexahydrotolylene diisocyanate, hexahydro-1,3- or -1,4-phenylene diisocyanate, benzidine diisocyanate, naphthalene 1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-tolylene diisocyanate (TDI), 2,4'-diphenylmethane diisocyanate, 2,2'-diphenylmethane diisocyanate or 4,4'-diphenylmethane diisocyanate (MDI) or their partially or fully hydrogenated cycloalkyl derivates, as for example fully hydrogenated MDI (H12-MDI), alkyl-substituted diphenylmethane diisocyanates, as for example mono-, di-, tri- or tetraalkyldiphenylmethane diisocyanate and also their partially or fully hydrogenated cycloalkyl derivates, 4,4'-diisocyanatophenylperfluoroethane, bis-isocyanatoethyl phthalate, 1-chloro-methylphenyl 2,4- or 2,6-diisocyanate, 1-bromomethylphenyl 2,4- or 2,6-diisocyanate, 3,3-bischloromethyl ether 4,4'-diphenyl diisocyanate, sulfur-containing diisocyanates, as obtainable by reaction of 2 mol of diisocyanate with 1 mol of thiodiglycol or dihydroxydihexyl sulfide, or the di- and triisocyanates of dimer and trimer fatty acids, or mixtures of two or more of the stated diisocyanates.

As polyisocyanates it is also possible to use isocyanates having a functionality of three or more, of the kind obtainable, for example, by oligomerization of diisocyanates, especially by oligomerization of the isocyanates stated above. Examples of such polyisocyanates with a functionality of three or more are the triisocyanurates of HDI or IPDI or mixtures thereof or their mixed triisocyanurates, and also polyphenylmethylene polyisocyanate, as is obtainable by phosgenation of aniline-formaldehyde condensation products.

Instead of or in addition to a reactive diluent it is also possible to use solvents for reducing the viscosity of the compositions based on silane-modified polymers (KS). Suitable solvents are aliphatic or aromatic hydrocarbons, halogenated hydrocarbons, alcohols, ketones, ethers, esters, ester alcohols, keto alcohols, keto ethers, keto esters, and ether esters. Preference, however, is given to using alcohols, since in that case the storage stability rises. $C_1$-$C_6$ alcohols, particularly methanol, ethanol, isopropanol, isoamyl alcohol and hexanol, are particularly preferred. The composition of the invention may further comprise an adhesion promoter. An adhesion promoter is a substance which enhances the adhesion properties of adhesive layers on surfaces. Customary adhesion promoters (tackifiers) known to the skilled person may be used, alone or as a combination of two or more compounds. Suitable examples include resins, terpene oligomers, coumarone/indene resins, aliphatic, petrochemical resins, and modified phenolic resins. Suitability in the context of the present invention is possessed for example by hydrocarbon resins of the kind obtained by polymerization of terpenes, primarily α- or β-pinene, dipentene or limonene. These monomers are polymerized in general cationically, with initiation using Friedel-Crafts catalysts. The terpene resins are also considered to include copolymers of terpenes and other monomers, examples being styrene, α-methylstyrene, isoprene and the like. The stated resins find use, for example, as adhesion promoters for pressure sensitive adhesives and coating materials. Likewise suitable are the terpene-phenolic resins, which are prepared by acid-catalyzed addition of phenols onto terpenes or rosin. Terpene-phenolic resins are soluble in the majority of organic solvents and oils and are miscible with other resins, waxes, and rubber. Likewise suitable as adhesion promoters in the above sense, in the context of the present invention, are the rosins and their derivatives, examples being their esters or alcohols. Especially suitable are silane adhesion promoters, particularly aminosilanes.

In one specific embodiment the compositions based on silane-modified polymers (KS) comprise a silane of the general formula (II), $$R^1R^2N\text{—}R^3\text{—}SiV'Y'Z' \qquad (II),$$

as adhesion promoter, in which
$R^1$ and $R^2$ independently of one another are hydrogen or $C_1$-$C_8$ alkyl radicals,
$R^3$ is a divalent, optionally heteroatom-containing hydrocarbon radical having 1-12 C atoms, and
V', Y', Z' each independently of one another are $C_1$-$C_8$ alkyl, $C_1$-$C_8$ alkoxy or $C_1$-$C_8$ acyloxy radicals, with at least one of the radicals V', Y', Z' being a $C_1$-$C_8$ alkoxy or $C_1$-$C_8$ acyloxy group.

Compounds of these kinds naturally have a high affinity to the binding polymer components of the composition based on silane-modified polymers (KS), but also to a broad spectrum of polar and apolar surfaces, and they therefore contribute to the development of particularly stable adhesion between the adhesive composition and the particular substrates to be bonded.

The linking group $R^3$ may be, for example, a straight-chain or branched or cyclic, substituted or unsubstituted alkylene radical. Present optionally as heteroatom therein is nitrogen (N) or oxygen (O). If V', Y' and/or Z' are an acyloxy group, this may for example be the acetoxy group —OCO—CH$_3$.

The compositions based on silane-modified polymers (KS) comprise one or more adhesion promoters preferably at 0.1 to 5 percent by weight, more preferably at 0.2 to 2 percent by weight, especially at 0.3 to 1 percent by weight, based in each case on the total weight of the composition.

The compositions based on silane-modified polymers (KS) may comprise a catalyst for the crosslinking of the silane-functional polymers by means of moisture. These are known to the skilled person. Such catalysts are, in particular, metal catalysts in the form of organotin compounds such as dibutyltin dilaurate and dibutyltin diacetylacetonate, titanium catalysts, compounds containing amino groups, as for example 1,4-diazabicyclo[2.2.2]octane and 2,2'-dimorpholinodiethyl ether, aminosilanes, and also mixtures of the catalysts stated. Preference is given to using compounds containing amino groups.

Examples of suitable fillers for the compositions based on silane-modified polymers (KS) include chalk, finely ground lime, precipitated and/or fumed silica, zeolites, bentonites, magnesium carbonate, kieselguhr, alumina, clay, tallow, titanium oxide, iron oxide, zinc oxide, sand, quartz, flint, mica, glass powders, and other ground minerals. It is also possible, additionally, to use organic fillers, especially carbon black, graphite, wood fibers, wood flour, wood shavings, cellulose, cotton, pulp, wood chips, chopped straw, chaff, ground walnut shells, and other short-cut fibers. Also possible, furthermore, is the addition of short fibers such as glass fibers, glass filament, polyacrylonitrile, carbon fiber, Kevlar fiber or else polyethylene fibers. Aluminum powder is likewise a suitable filler. Further suitable fillers include hollow spheres having a mineral shell or a polymeric shell. These may for example be hollow glass spheres, which are available commercially under the trade designations of Glass Bubbles®.

Polymer-based hollow spheres are available commercially under the designations Expancel® or Dualite®, for example. They are composed of organic or inorganic substances, each with a diameter of 1 mm or less, preferably of 500 µm or less. There are certain applications for which preferred fillers are those which endow the preparations with thixotropy. Such fillers are also described as theological assistants—for example, hydrogenized castor oil, fatty acid amides or swellable plastics such as PVC. To allow them to be extruded effectively from a suitable metering apparatus (tube, for example), such preparations possess a viscosity of 3000 to 15 000, preferably 4000 to 8000 mPas or else 5000 to 6000 mPas.

The fillers are used preferably in an amount of 1 to 80 percent by weight, more preferably of 10 to 70% by weight, as for example of 25 to 60 percent by weight, more particularly of 35 to 55 percent by weight, based on the total weight of the composition based on silane-modified polymers (KS). An individual filler or a combination of two or more fillers may be used.

Used as filler for example is a finely divided silica having a BET surface area of 10 to 500 m²/g. When used, a silica of this kind does not result in any substantial increase to the viscosity of the composition based on silane-modified polymers (KS), but does contribute to strengthening the cured preparation. Via this strength an improvement is achieved, for example, in the initial strengths, lap shear strengths and the adhesion of the adhesives, sealants or coating materials in which the composition based on silane-modified polymers (KS) is used. Preference is given to using uncoated silicas having a BET surface area of less than 100, more preferably of less than 65 m²/g, and/or coated silicas having a BET surface area of 100 to 400, more preferably of 100 to 300, especially of 150 to 300, and very preferably of 200 to 300 m²/g.

Zeolites used are preferably alkali metal aluminosilicates, examples being sodium potassium aluminosilicates of the general empirical formula $aK_2O*bNa_2O*Al_2O_3*2SiO*nH_2O$ with $0<a$, $b<1$ and $a+b=1$. The pore opening of the zeolite used or zeolites used is preferably just large enough to accommodate water molecules. Accordingly, an effective pore opening of the zeolites of less than 0.4 nm is preferred. With particular preference the effective pore opening is 0.3 nm±0.02 nm. The one or more zeolites are used preferably in the form of powder.

Chalk is preferred for use as a filler. Chalk used here may comprise cubic, noncubic, amorphous, and other modifications of calcium carbonate.

The chalks used are preferably surface treated or coated. Coating agents used are preferably fatty acids, fatty acid soaps, and fatty acid esters, examples being lauric acid, palmitic acid or stearic acid, sodium or potassium salts of such acids, or their alkyl esters. Also suitable, however, are other surface-active substances such as sulfate esters of long-chain alcohols or alkylbenzenesulfonic acids and/or their sodium or potassium salts, or else coupling reagents based on silanes or titanates. The surface treatment of the chalks frequently entails an improvement in the workability and also in the bond strength and the weather resistance as well of the compositions. The coating agent is used customarily in a fraction of 0.1 to 20 percent by weight, preferably 1 to 5 percent by weight, based on the total weight of the unprocessed chalk.

Depending on the profile of properties being aimed at, it is possible to use precipitated or ground chalks or mixtures thereof. Ground chalks may be produced, for example, from natural lime, limestone or marble, by mechanical grinding, in which dry or wet techniques may be employed. Depending on the grinding method, fractions with different average particle size are obtained. Advantageous specific surface area values (BET) are between 1.5 m²/g and 50 m²/g.

Furthermore, the composition based on silane-modified polymers (KS) may comprise antioxidants. The fraction of the antioxidants in the composition based on silane-modified polymers (KS) is preferably up to 7 percent by weight, especially up to 5 percent by weight, based in each case on the total weight of the composition. The composition based on silane-modified polymers (KS) may further comprise UV stabilizers. The fraction of the UV stabilizers in the composition based on silane-modified polymers (KS) is preferably up to 2 percent by weight, especially up to 1 percent by weight. Particularly suitable UV stabilizers are those which are called hindered amine light stabilizers (HALS). Preference is given to using a UV stabilizer which carries a silyl group and which on crosslinking/curing is incorporated into the end product. Particularly suitable for this purpose are the products Lowilite 75 and Lowilite 77 (from Great Lakes, USA). It is possible, furthermore, to add benzotriazoles, benzophenones, benzoates, cyanoacrylates, acrylates, sterically hindered phenols, phosphorus and/or sulfur.

Frequently it is sensible to further stabilize the composition based on silane-modified polymers (KS) with respect to moisture penetration, in order to achieve an even greater increase in the shelf life. A shelf life improvement of this kind can be achieved, for example, through the use of drying agents. Suitable drying agents are all compounds which react with water to form a group which is inert toward the reactive groups present in the composition, the compounds in this case undergoing minimum changes in their molecular weight. Moreover, the reactivity of the drying agents toward moisture which has penetrated the composition must be greater than the reactivity of the endgroups of the polymer in the composition that carries silyl groups. Isocyanates are examples of suitable drying agents.

Also used advantageously as drying agents are silanes, examples being vinylsilanes such as 3-vinylpropyltriethoxysilane, oxime silanes such as methyl-O,O',O"-butan-2-one trioximosilane or O,O',O",O'"-butan-2-one tetraoximosilane (CAS No. 022984-54-9 and 034206-40-1) or benzoamidosilanes such as bis(N-methylbenzamido)methylethoxysilane (CAS No. 16230-35-6) or carbamatosilanes such as carbamatomethyltrimethoxysilane. The use, however, of methyl-, ethyl- or vinyltrimethoxysilane, tetramethyl- or -ethylethoxysilane is also possible. Particularly preferred here in terms of efficiency and costs are vinyltrimethoxysilane and tetraethoxysilane. Likewise suitable as drying agents are the aforementioned reactive diluents, provided they have a molecular weight ($M_n$) of less than about 5000 g/mol and possess endgroups whose reactivity with respect to moisture penetration is at least as great, preferably greater, than the reactivity of the reactive groups of the polymer of the invention carrying silyl groups. As drying agents it is also possible, finally, to use alkyl orthoformates or orthoacetates, examples being methyl or ethyl orthoformate, methyl or ethyl orthoacetate. The composition based on silane-modified polymers (KS) preferably comprises 0.01 to 10 percent by weight of drying agent, based on the total weight of the composition.

The composition based on silane-modified polymers (KS) preferably comprises the following constituents in the weight proportions indicated:

5-75 percent by weight of at least one silane-modified polymer having at least one end group of the general formula (I)
5-75 percent by weight of filler
5-35 percent by weight of plasticizer
0.01-1 percent by weight of catalyst
where the weight proportions add up to 100 percent by weight and the weight proportions are based on the total weight of composition based on silane-modified polymers (KS).

As auxiliaries the composition based on silane-modified polymers (KS), in addition to the constituents already recited, may comprise, for example, stabilizers, UV stabilizers, aging inhibitors, rheological assistants, color pigments or color pastes, fungicides, flame retardants and/or optionally to a small extent solvents as well.

The composition based on silane-modified polymers (KS) is produced by known processes, by intimate mixing of the constituents in suitable dispersing assemblies, as for example a high-speed mixer.

The composition based on silane-modified polymers (KS) may of course also be used as a sealant instead of as an adhesive.

In the selection of the composition based on silane-modified polymers (KS) it is of course also possible to employ products which are already available commercially and which are sold under the designation SMP adhesive, STP adhesive or else hybrid adhesive. (Identify commercial products).

Two-component (2K) coating compositions which as binder comprise a polyisocyanate component in combination with a reactive component that is reactive toward isocyanate groups, especially a polyhydroxyl component, have been known for some considerable time. They are suitable for producing high-grade coatings which may be formulated to be hard, elastic, abrasion- and solvent-resistant, and also, in particular, stable to weathering. Within this 2K polyurethane coating technology, recent times have seen the establishment of particular secondary polyamines containing ester groups, which in combination with polyisocyanates are suitable especially as binders in low-solvent or solvent-free high-solids coating compositions and enable rapid curing of the coatings at low temperatures.

These secondary polyamines are the so-called polyaspartic esters. These polyaspartic esters are also called aspartates. Their use alone or in a mixture with other components reactive toward isocyanate groups in 2K polyurethane coating compositions is described for example in EP0403921, EP0639628, EP0667362, EP0689881, U.S. Pat. Nos. 5,214,086, 6,605,684, EP0573860, EP0699696, EP0596360, EP0893458A, DE19701835, DE102006002153, EP1767559, WO2001007504, WO2001007399, WO2004033517, U.S. Pat. No. 6,458,293, EP1426397, and U.S. Pat. No. 5,243,012.

The synthesis of the polyaspartic esters is known per se and takes place via an addition of primary amines onto an activated carbon double bond of vinylogous carbonyl compounds, as present for example in maleic or fumaric esters, which is adequately described in the literature (Hauben Weyl, Meth. d. Org. Chemie vol. 11/1, 272 (1957), Usp. Khim. 1969, 38, 1933). Polyaspartates are known in the prior art as 2-component coating systems for the priming of mineral substrates from EP3098247. In the context of this disclosure, the provision of polyaspartates achieved the object of discovering priming systems for mineral substrates that are insensitive to moisture and that cure at low ambient temperature, while nevertheless having a sufficiently long working time to allow them to be able to be applied by hand without problems and to ensure sufficient wetting of the substrate.

In the context of the present invention of the layer structure of polyaspartate primer (AG) and composition based on silane-modified polymers (KS), polyaspartate primers AG are used, comprising (i) at least one isocyanate component comprising at least one polyisocyanate (ii) at least one amino-functional polyaspartic ester of the general formula (III),

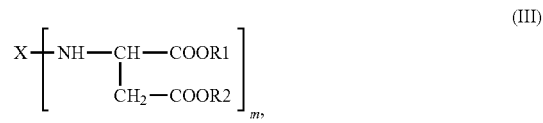

in which

X is an m-valent organic radical optionally containing one or more heteroatoms, as may be obtained by removal of the primary amino group or groups from a corresponding polyamine of the 60 to 6000 g/mol molecular weight range and containing (cyclo)aliphatically and/or araliphatically bonded primary amino groups, and which may comprise further functional groups which are reactive toward isocyanate groups and/or which are inert at temperatures up to 100° C., R1 and R2 are identical or different organic radicals, preferably identical or different alkyl radicals each having 1 to 18 carbon atoms, more preferably identical or different alkyl radicals each having 1 to 8 carbon atoms, and very preferably methyl and/or ethyl, m is an integer>1, preferably ≥2, and more preferably =2.

For elucidation it is noted here that the parent polyamine of the radical X—including the amino groups removed—has a molecular weight within the stated range. In the case of monomeric polyamines of known empirical formula such as 1,6-diaminohexane, for example, "molecular weight" refers to the molar mass M of the polyamine, which can be calculated by the skilled person via the sum total of the atomic masses of all the atoms in a molecule. In the case of polyamines present in the form of a mixture of oligomers and/or polymers, it refers to the number-average molecular weight of the polyamine as may be determined by gel permeation chromatography (GPC, also: SEC). The gel permeation chromatography (GPC) is carried out using a refractometer as detector. The mobile phase used is hexafluoroisopropanol (HFIP); a standard employed for determining the molecular weight (weight-average molecular weight ($M_w$) and number-average molecular weight ($M_n$)) is polymethyl methacrylate (PMMA).

Suitability as isocyanate component i) is possessed by all polyisocyanates known to the skilled person to be suitable for preparing polyisocyanate polyaddition products, especially polyurethanes, the polyisocyanates being more particularly the group of the organic aliphatic, cycloaliphatic, araliphatic and/or aromatic polyisocyanates having at least two isocyanate groups per molecule and also mixtures thereof. Examples of such polyisocyanates are di- or triisocyanates, such as, for example, 1,4-butane diisocyanate, 1,5-pentane diisocyanate (pentamethylene diisocyanate, PDI), 1,6-hexane diisocyanate (hexamethylene diisocyanate, HDI), 4-isocyanatomethyl-1,8-octane diisocyanate (triisocyanatononane, TIN), 4,4'-methylenebis(cyclohexyl isocyanate) (H12MDI), 3,5,5-trimethyl-1-isocyanato-3-isocyanatomethylcyclohexane (isophorone diisocyanate, IPDI), 1,3- and also 1,4-bis(isocyanatomethyl)cyclohexane (H6XDI), 1,5-naphthalene diisocyanate, diisocyanatodiphenylmethane (2,2'-, 2,4'-, and 4,4'-MDI or mixtures thereof), diisocyanatomethylbenzene (2,4- and 2,6-tolylene diisocyanate, TDI) and technical mixtures of the two isomers, and also 1,3 and/or 1,4-bis(isocyanatomethyl)benzene (XDI), 3,3'-dimethyl-4,4'-biphenyl diisocyanate (TODI), 1,4-paraphenylene diisocyanate (PPDI), 1,3-tetramethylxylylene diisocyanates (TMXDI), and also cyclohexyl diisocyanate (CHDI), and the higher molecular oligomers that are obtainable individually or in a mixture from those stated above, and which have biuret, uretdione, isocyanurate, iminooxadiazinedione, allophanate, urethane and also carbodiimide/uretonimine structural units. Preferred for use are polyisocyanates based on aliphatic and cycloaliphatic diisocyanates.

Preference is given to polyaspartate primer (AG) wherein at least one polyisocyanate is an aliphatic and/or cycloaliphatic polyisocyanate. Likewise preferred is for at least one polyisocyanate to be a derivative of hexamethylene diisocyanate and/or of pentamethylene diisocyanate, especially a hexamethylene diisocyanate trimer and/or a pentamethylene diisocyanate trimer.

The ratio of polyisocyanates to NCO-reactive compounds (NH groups of the amino-functional polyaspartic esters, based on the amounts-of-substance of the polyisocyanate groups relative to the NCO-reactive groups) is preferably 0.5:1.0 to 3.0:1.0. Particularly preferred is a ratio of 0.9:1.0 to 1.5:1.0. Especially preferred is a ratio of 1.05:1.0 to 1.25:1.0.

Preferred are amino-functional polyaspartic esters (ii) of the general formula (III),

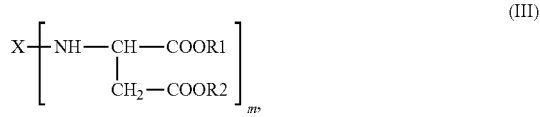

(III)

in which
X is an n-valent organic radical which is obtained by removal of all of the amino groups from a polyamine selected from the group of 1-amino-3,3,5-trimethyl-5-aminomethylcyclohexane, 2,4- and/or 2,6-hexahydrotolylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane or mixtures thereof, and
R1 and R2 independently of one another are a methyl group or an ethyl group.

The amino-functional polyaspartic esters (ii) may be prepared in a manner known per se by reaction of the corresponding primary polyamines of the formula [X]+NH2 with maleic or fumaric esters of the general formula R1OOCCH=CHCOOR2. Suitable polyamines are the diamines stated above. Examples of suitable maleic or fumaric esters are dimethyl maleate and preferably diethyl maleate, and also the corresponding fumaric esters.

Nonlimiting examples of primary polyamines of the formula [X]+NH2 in the context of the invention are ethylenediamine, 1,2-diaminopropane, 1,4-diaminobutane, 1,5-diaminopentane, 2,5-diamino-2,5-dimethylhexane, 1,5-diamino-2-methylpentane (Dytek®A, DuPont), 1,6-diaminohexane, 2,2,4- and/or 2,4,4-trimethyl-1,6-diaminohexane, 1,11-diaminoundecane, 1,12-diaminododecane or triaminononane, etheramines, such as 4,9-dioxadodecane-1,12-diamine, 4,7,10-trioxatridecane-1,13-diamine, for example, or higher molecular weight polyether polyamines having aliphatically bonded, primary amino groups, of the kind sold under the Jeffamin® tradename by Huntsman, for example. Likewise employable are aliphatic polycyclic polyamines, such as tricyclodecanebismethylamine (TCD Diamine) or bis(aminomethyl)norbornanes, amino-functional siloxanes, as for example diaminopropylsiloxane G10 DAS (from Momentive), fatty-alkyl-based amines, for example Fentamine from Solvay, dimeric fatty acid diamines such as Priamine from Croda, for example.

The amino-functional polyaspartic esters (ii) are prepared from the stated starting materials preferably within the temperature range from 0 to 100° C., the starting materials being used in proportions such that for each primary amino group there is at least one, preferably exactly one, olefinic double bond, and after the reaction any excess starting materials used can be removed by distillation. The reaction may take place in bulk or in the presence of suitable solvents such as methanol, ethanol, propanol or dioxane or mixtures of such solvents, the accompanying use of solvents being less preferable.

To produce the polyaspartate primers (AG), components (i) and (ii) are mixed immediately prior to application in amounts such that the equivalent ratio of the isocyanate groups of component (i) to the amino groups of component (ii) is 0.5:1 to 1.5:1, preferably 0.9:1 to 1.3:1, more preferably 1.05 to 1.2.

The polyaspartate primers (AG) consist of components (i) and (ii) substantially, i.e., with a mass fraction of preferably more than 85%, more preferably more than 90%. In minor amounts, accompanying use may be made of auxiliaries and adjuvants of the kind known from coatings technology.

Examples that may be mentioned in this context include fillers, dyes and pigments, deaerating agents, defoamers, catalysts, aging inhibitors, flow control assistants, adhesion promoters, plasticizers, solvents and reactive diluents. The primers which can be used in the invention preferably comprise no plasticizers and no solvents. As reactive diluents it is possible optionally to make accompanying use of polyetheramine-based aspartic esters, as is disclosed in WO 2014151307 A1. It is, however, also possible with preference for polyether polyols of the above-characterized kind to be used accompanyingly as reactive diluents. The stated reactive diluents may be used accompanyingly in a mass fraction of preferably less than 15%, more preferably less than 10%.

To produce the polyaspartate primers (AG), the individual components and any auxiliaries and adjuvants to be used as well are mixed intensively with one another. The reaction mixtures react even at room temperature to form polyureas and therefore have only a limited potlife. The reaction mixtures are processed within this potlife. The polyaspartate primers (AG) generally have a potlife at 23° C. of 15 to 30 minutes, the potlife being defined as the period within which the coating can be applied evenly, without stringing.

The polyaspartate primers (AG) obtainable from the individual components can be applied to any desired mineral substrates by techniques which are known per se, such as, for example, by spraying, spreading, flow-coating, or by means of rollers, rolls or doctors.

The working time—depending on the ambient climatic conditions—is generally 15 minutes to 30 minutes. They cure—depending on the ambient climatic conditions—usually within from 30 to 90 minutes to form tough, hard coatings, which are extremely robust mechanically and exhibit excellent adhesion to the mineral substrate.

The polyaspartate primers AG surprisingly cure completely without bubbles and pores even on substrates with residual moisture, such as concrete with a residual moisture content of >4%. In this case, then, the $CO_2$-forming reaction of the free isocyanate groups with the moisture seems to be completely suppressed in these polyaspartate primers AG, surprisingly, even when operating, in accordance with the details given above, with a significant stoichiometric excess of isocyanate groups.

The polyaspartate primers (AG) can be used in the invention for construction substrates, such as screeds or wooden surfaces, in combination with silane-modified polymer adhesives for the bonding of wood, cork, linoleum, rubber and/or PVC floors.

The polyaspartate primers (AG) exhibit very good adhesion to structural substrates, which may still include residual amounts of water.

In the invention, the composition based on silane-modified polymers (KS) may be applied to the polyaspartate primer (AG) after just 1-4 h without any plasticizer instability being apparent in the form of partial dissolution of the primer, and/or adhesion problems.

In the invention, the composition based on silane-modified polymers (KS) may also be applied up to 72 h after application of the polyaspartate primer (AG), without any adhesion problems between the primer and the adhesive.

Of particular surprise is that in the context of the present invention there is no discernible reaction of isocyanate groups in the polyaspartate primer (AG), still present upon the application of the composition based on silane-modified polymers (KS), with isocyanate-reactive groups which are present in the composition based on silane-modified polymers (KS) or are given off in the course of curing.

A subject of the present invention is a layer structure comprising at least one polyaspartate primer (AG) and at least one composition applied thereon and based on silane-modified polymers (KS).

A further subject of the present invention is the above-specified layer structure comprising at least one polyaspartate primer (AG), characterized in that it comprises
(i) at least one isocyanate component comprising at least one polyisocyanate, and
(ii) at least one amino-functional polyaspartic ester of the general formula

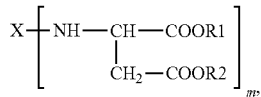

in which
X is an m-valent organic radical optionally containing one or more heteroatoms, as may be obtained by removal of the primary amino group or groups from a corresponding polyamine of the 60 to 6000 g/mol molecular weight range and containing (cyclo)aliphatically and/or araliphatically bonded primary amino groups, and which may comprise further functional groups which are reactive toward isocyanate groups and/or which are inert at temperatures up to 100° C.,
R1 and R2 are identical or different organic radicals, preferably identical or different alkyl radicals each having 1 to 18 carbon atoms, more preferably identical or different alkyl radicals each having 1 to 8 carbon atoms, and very preferably methyl and/or ethyl,
m is an integer>1, preferably >2, and more preferably =2,
and at least one curable composition applied thereon and based on silane-modified polymers (KS), characterized in that the silane-modified polymers comprise at least one end group of the general formula (I), $$-A_n-R-SiVYZ \qquad (I),$$

in which
A is a divalent linking group comprising at least one heteroatom,
R is a divalent hydrocarbon radical having 1-12 carbon atoms,
V, Y, and Z are substituents on the Si atom, and independently of one another are $C_1$-C8 alkyl, $C_1$-$C_8$ alkoxy or $C_1$-$C_8$ acyloxy groups, where at least one of the radicals V, Y, and Z is a $C_1$-$C_8$ alkoxy or $C_1$-C8 acyloxy group, and
n is 0 or 1.

A further preferred subject of the present invention is the above-specified layer structure comprising at least one polyaspartate primer (AG), characterized in that it comprises
(i) at least one isocyanate component comprising at least one polyisocyanate based on aliphatic and/or cycloaliphatic diisocyanates,
(ii) at least one amino-functional polyaspartic ester of the general formula (III) in which
X is an n-valent organic radical which is obtained by removal of all of the amino groups from a polyamine selected from the group of 1-amino-3,3,5-trimethyl-5-aminomethylcyclohexane, 2,4- and/or 2,6-hexahydrotolylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane or mixtures thereof, and
R1 and R2 independently of one another are a methyl group or an ethyl group,
and at least one curable composition applied thereon and based on silane-modified polymers (KS), characterized in that the silane-modified polymers comprise at least one end group of the general formula (I), in which
A is an oxygen atom or a group —NR'—, in which R' is an H atom or an alkyl or aryl radical having 1 to 12 C atoms, amide, carbamate, urea, imino, carboxylate, carbamoyl, amidino, carbonate, sulfonate or sulfinate group,
R is a divalent hydrocarbon radical having 1-6 carbon atoms,
V, Y, and Z are substituents on the Si atom and in each case independently of one another are a methyl, ethyl, methoxy or ethoxy group, where at least one of the radicals, V, Y or Z, is a methoxy or ethoxy group,
n is 0 or 1.

A further preferred subject of the present invention is the above-specified layer structure comprising at least one polyaspartate primer (AG), characterized in that it comprises
(i) at least one isocyanate component comprising at least one polyisocyanate which is
(ii) at least one amino-functional polyaspartic ester of the general formula (III) in which
X is an n-valent organic radical which is obtained by removal of all of the amino groups from a polyamine selected from the group of 1-amino-3,3,5-trimethyl-5-aminomethylcyclohexane, 2,4- and/or 2,6-hexahydrotolylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane or mixtures thereof, and
R1 and R2 independently of one another are a methyl group or an ethyl group, and at least one curable composition applied thereon and based on silane-modified polymers (KS), characterized in that the silane-modified polymers comprise at least one end group of the general formula (I), in which A is an oxygen atom or a group —NR'—, in which R' is an H atom or an alkyl or aryl radical having 1 to 12 C atoms, amide, carbamate, urea, imino, carboxylate, carbamoyl, amidino, carbonate, sulfonate or sulfinate group, R is a divalent hydrocarbon radical having 1-6 carbon atoms, V, Y, and Z are substituents on the Si atom and in each case independently of one another are a methyl or methoxy group, where at least one of the radicals, V, Y or Z, is a methoxy group, n is 0 or 1.

A further preferred subject matter of the present invention is the above-specified layer structure comprising at least one polyaspartate primer (AG), characterized in that it comprises (i) at least one isocyanate component comprising at least one polyisocyanate which is a derivative of hexamethylene diisocyanate and/or of pentamethylene diisocyanate, (ii) at least one amino-functional polyaspartic ester of the general formula (III) in which X is an n-valent organic radical which is obtained by removal of all of the amino groups from a polyamine selected from the group of 1-amino-3,3,5-trimethyl-5-aminomethylcyclohexane, 2,4- and/or 2,6-hexahydrotolylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane or mixtures thereof, and R1 and R2 independently of one another are a methyl group or an ethyl group, and at least one curable composition applied thereon and based on silane-modified polymers (KS), characterized in that the silane-modified polymers comprise at least one end group of the general formula (I), in which A is an oxygen atom or a group —NR'—, in which R' is an H atom or an alkyl or aryl radical having 1 to 12 C atoms, amide, carbamate, urea, imino, carboxylate, carbamoyl, amidino, carbonate, sulfonate or sulfinate group, R is a divalent hydrocarbon radical having 1-6 carbon atoms, V, Y, and Z are substituents on the Si atom, where V is an alkyl group and Y and Z independently of one another are an alkoxy group, and n is 0 or 1.

A further subject of the present invention is a layer system comprising at least one of the above-specified layer structures comprising at least one polyaspartate primer (AG) and, applied thereon, curable composition based on silane-modified polymers (KS).

A further subject of the present invention is the above-specified layer system comprising at least one of the above-specified layer structures comprising at least one polyaspartate primer (AG) and curable composition applied thereon and based on silane-modified polymers (KS), and substrate bonded adhesively thereto, as for example floor covering.

A further subject of the present invention is a method for adhesively bonding floor coverings to pretreated substrates using at least one of the above-specified layer structures comprising at least one polyaspartate primer (AG) as pretreatment and at least one curable composition based on silane-modified polymers (KS) as adhesive.

A further subject of the present invention is the above-specified method for adhesively bonding floor coverings to pretreated (primed) substrates using at least one of the above-specified layer structures comprising at least one polyaspartate primer (AG) as pretreatment (primer) and at least one curable composition based on silane-modified polymers (KS) as adhesive, characterized in that the polyaspartate primer (AG) is applied as a single layer.

A further subject of the present invention is the above-specified method for adhesively bonding floor coverings to pretreated substrates using at least one of the above-specified layer structures comprising at least one polyaspartate primer (AG) as pretreatment (primer) and at least one curable composition based on silane-modified polymers (KS) as adhesive, characterized in that a polyaspartate primer (AG) is applied first to the substrate, as a pretreatment, and thereafter the floor covering is bonded to the substrate thus pretreated, using at least one curable composition based on silane-modified polymers (KS), characterized in that the curable composition based on silane-modified polymers (KS) is applied between 1-72 h, preferably 1-48 h, more preferably 2-24 h after the application of the polyaspartate primer.

The substrates to which the polyaspartate primers (AG) are applied preferably at application have a surface temperature of between 5 and 35 degrees C.

A further subject of the present invention is the use of at least one of the above-specified layer structures comprising at least one polyaspartate primer (AG) and at least one curable composition based on silane-modified polymers (KS) in the adhesive bonding of a floor covering on a substrate.

Suitable substrates are especially the substrates customary in fitting out interiors. These are, for example, concrete, cement, cement screed, self-leveling cement screed, cement mortar, cement-bound wood fibers, ceramic, natural stone, calcium sulfate screed, self-leveling calcium sulfate screed, magnesite screed, wood, woodbase material, plywood, cork, gypsum, gypsum fiber, plasterboard, hard fiber, mineral troweling compound, fiberlike textile material, or a layer structure of these materials.

Examples of suitable floor coverings include linoleum floors, PVC floors, rubber floors, latex floors, textile floor coverings, laminate or wooden flooring elements. In one preferred embodiment, the floor covering is a wood floor especially parquet, very particularly solid parquet.

A further subject of the present invention is the use of at least one of the above-specified layer structures comprising at least one polyaspartate primer (AG) and at least one curable composition based on silane-modified polymers (KS) in the sealing of joints, as for example building joints, joints between facade elements. The polyaspartate primer (AG) here may be applied to only one substrate or to both substrates forming the joint.

A kit of parts comprising at least one of the above-specified polyaspartate primers (AG) and at least one of the above-specified curable compositions based on silane-modified polymers (KS).

The above-specified kit of parts comprising at least one of the above-specified polyaspartate primers (AG) and at least one of the above-specified curable compositions based on silane-modified polymers (KS) for use for constructing a layer system.

The above-specified kit of parts comprising at least one of the above-specified polyaspartate primers (AG) and at least one of the above-specified curable compositions based on silane-modified polymers (KS) for use for constructing a layer system for adhesively bonding a floor covering on a substrate.

The above-specified kit of parts comprising at least one of the above-specified polyaspartate primers (AG) and at least one of the above-specified curable compositions based on silane-modified polymers (KS) for use for constructing a layer system for sealing joints.

Experimental Section

Preparation of a Silane-Terminated Prepolymer with Urethane and Urea Groups P1

In a 2 L sulfonating beaker with lid, stirrer, thermometer, and nitrogen sparging, 880.1 g of a difunctional propylene glycol with an OH number of 13.4 mg KOH/g (determined according to DIN 53240-1(2012)) (Acclaim® Polyol 8200 N from Covestro Deutschland AG; Leverkusen DE) were reacted with 46.7 g of isophorone diisocyanate (IPDI, Desmodur® I, Covestro Deutschland AG, NCO content 37.8%, molar mass 222 g/mol) at 60° C. with addition of 0.04 g of dibutyltin dilaurate for 5 h. Following addition of 74 g of diethyl N-(3-trimethoxysilylpropyl)aspartate (prepared according to EP-A 596 360, ex. 5), the mixture was stirred until an isocyanate band was no longer visible in the IR spectrum.

Production of a Curable Composition KS1 (e.g., Floor Covering Adhesive)

A curable composition based on the polymer composition P1 was produced according to the following protocol: 551 g of Omyalite 95 T filler (calcium carbonate, from Omya), dried beforehand in a forced air drying cabinet at 100° C. for 16 h, are dispersed with 218 g of plasticizer (Mesamoll, from Lanxess, water content 0.03% by weight), 178 g of polymer composition P1, 8.1 g of Cab-O-Sil TS 720 (hydrophobic pyrogenic silica filler, from Cabot, water content around 0.11% by weight), 23 g of Dynasilan VTMO (silane-based drying agent, from Evonik) and 1.2 g of 1,8-diazabicyclo [5.4.0]undec-7-ene (Sigma-Aldrich Co. LLC) in a laboratory dissolver with butterfly stirrer (200 revolutions/min) and dissolver disk (2500 revolutions/min) for 15 min under static reduced pressure and with cooling. Under static reduced pressure means here that the apparatus is evacuated to a pressure of 200 mbar (dynamic reduced pressure) and thereafter the connection to the vacuum pump is separated. Cooling was selected so that the temperature does not exceed 65° C. throughout the production. Then 15.4 g of Dynasilan 1146 (aminosilane adhesion promoter, from Evonik) were added and the system was mixed with a dissolver disk (1000 revolutions/min) under static reduced pressure and with cooling for 10 min. Lastly the mixture was mixed further under dynamic reduced pressure for 5 min with a dissolver disk (1000 revolutions/min).

Production of a Polyaspartate Primer AG

Ingredients

Desmophen® NH 1420—polyaspartic ester, from Covestro, equivalent weight 276 g/mol Desmophen® NH 2850 XP—polyaspartic ester, from Covestro, equivalent weight 295 g/mol Desmodur® N 3900—polyisocyanate based on hexamethylene diisocyanate, from Covestro, equivalent weight 179 g/mol Sylosiv® A4—molecular sieve A4 in powder form, from Grace GmbH&Co. KG Tego® Airex 944—defoamer, from Evonik Tego Chemie GmbH Tego® Wet 250—wetting assistant, from Evonik Tego Chemie GmbH Desmodur E29—polyurethane prepolymer based on MDI, from Covestro

TABLE 1

|  | A1 | A2 |
|---|---|---|
| Desmophen ® NH 1420 | 4846 g | 2060 g |
| Desmophen ® NH 2850 | 0 g | 880 g |
| Sylosiv ® A4 | 96 g | 60 g |
| Tego ® Airex 944 | 49 g | 30 g |
| Tego ® Wet 250 | 9 g | 10 g |

TABLE 2

|  | AG1 | AG2 |
|---|---|---|
| Desmodur ® N 3900 | 41.32% | 40.75% |
| Component A1 | 58.68% |  |
| Component A2 |  | 59.25% |
| NCO/OH ratio, molar | 1.12:1 | 1.12:1 |

Component A was prepared by mixing all of the components identified in table 1 in a dissolver at 1000 rpm for 30 min.

Component A and the polyisocyanates identified in table 2 were intimately mixed in a Speedmixer in the mass ratios indicated in table 2 (total amount 50 g) for 5 min and were processed immediately after mixing.

Determination of Lap Shear Strength

For determining the lap shear strength, wooden test specimens made of two pieces of beech were used, with a single overlap 10 mm long and with a bonding gap about 1 mm thick. The pieces of beech used for these specimens each had the following dimensions: length=40 mm, width=20 mm, thickness=5 mm—and prior to use they were stored for at least 1 week by day at 23° C./50% relative humidity.

Unless otherwise described, the test specimens were produced using one of the two overlapping pieces of beech without further pretreatment; the second piece of beech was pretreated or primed as described below under "Production of the pretreated beech pieces for producing the test specimens for the lap shear strength test". After the specified waiting time in each case, the adhesive was applied to the pretreated piece of beech, and the second piece of beech (untreated) was placed on. Adhesive emerging from the sides was, when present, immediately removed with a spatula. The test specimens were stored in a suitable apparatus with the aid of small metal plates to set the thickness of the bond gap. In the case of the experiments without primer/pretreatment, two unpretreated pieces of beech were used in each case.

The test specimens were stored for 3 days at 23° C./50% relative humidity. (STORAGE SEQUENCE 1)

The test specimens were alternatively stored for 7 days at 23° C./50% relative humidity, thereafter for 20 days at 40° C. in a forced-air oven, and lastly for 1 day at 23° C./50% relative humidity. (STORAGE SEQUENCE 2)

The test specimens were alternatively stored for 28 days at 23° C./50% relative humidity, and thereafter for 28 days at 60° C. in a forced-air oven. (STORAGE SEQUENCE 3)

The lap shear strength was measured on a tensile testing machine at an advancement rate of 100 mm/min in each case. During this measurement, the test specimens were extended to break and the forces required were measured. The results recorded correspond to the arithmetic mean from 5 experiments.

Production of the Pretreated Beech Pieces for Producing the Test Specimens for the Lap Shear Strength Test First of all, immediately after the mixing of component A and the polyisocyanate (Desmodur® N 3900), the pieces of beech had the mixture applied to them over their whole area in one layer using a brush (applied weight 85 g/m²). The pretreated or primed pieces of beech thus obtained were stored, prior to the application of the curable compositions, for the period specified in the tables below ("Storage of pretreated pieces of beech" (synonymous with waiting time)) at 23 degrees Celsius and 50% relative humidity, unless otherwise indicated, before the curable compositions were applied.

With this construction (beech/curable composition/primer/beech) it was possible to study the strength of the assembly of primer and cured adhesive in response to lap shear loading. Particularly in comparison with a construction without the primer (beech/curable composition/beech) it is here apparent whether the primer has a distinctly adverse effect on the strength of the assembly—any such effect being undesirable in practice.

Example 1

The lap shear strengths of test specimens produced using the above-described curable composition KS1 of the invention and the primer AG1 of the invention were ascertained.

TABLE 3a results of inventive examples (a test specimen pretreated with AG1, adhesive KS1)

| Storage of pretreated pieces of beech (waiting time) | Lap shear strength (N/mm²) Storage sequence 1 | Lap shear strength (N/mm²) Storage sequence 2 | Lap shear strength (N/mm²) Storage sequence 3 |
|---|---|---|---|
| 4 h | 2.7 | 3.7 | 3.9 |
| 24 h | 2.8 | 3.3 | 4.5 |
| 24 h and 72 h at 50° C. in forced-air drying cabinet | 2.6 | 3.4 | 4.5 |

The adhesive exhibits predominantly cohesive failure in each case. There are some areas in which the primer parts from the wood. The adhesion of primer to adhesive is outstanding.

Example 2

As described above, lap shear strengths of the above-described curable composition KS1 of the invention on beech test specimens coated beforehand as described above with the primer AG2 of the invention were ascertained.

TABLE 3b results of inventive example (a piece of beech pretreated with AG2, adhesive KS2)

| Storage of pretreated pieces of beech (waiting time) | Example 4 Lap shear strength (N/mm²) Storage sequence 1 |
|---|---|
| 2 h | 2.82 |
| 24 h | 2.85 |

The adhesive exhibits predominantly cohesive failure. There are some areas in which the primer parts from the wood. The adhesion of primer to adhesive is outstanding.

On priming with AG2 and a waiting time of only 2 h before application of KS1, the resulting lap shear strength (storage sequence 1, 3 d) is at the same level as that achieved with a waiting time of 24 h.

Examples 1 and 2 show that the lap shear strengths of the test specimens with the inventive priming of the woods are at a high level, irrespective of the waiting time duration (between 2 and 24 h with storage for 72 h at 50 degrees C.). Even after very long storage under forced conditions (storage sequence 3) of the test specimens, high lap shear strengths are achieved, which suggests high plasticizer resistance.

Example 3 (Comparative)

The procedure continued analogously, except that rather than the AG1 or AG2 of the invention, a primer was used which was based on 1K polyurethane (Desmodur E29) and was applied in two layers with a brush. After the first application, the system was stored for 1 h, after which a second layer was applied, resulting overall in a comparable applied weight of 85 g/m² in total, as for AG1 and AG2 in examples 1-4. From the test specimens thus pretreated, and after the waiting time specified in table 4 (measured from the 2$^{nd}$ application), the curable composition KS1 of the invention was applied.

TABLE 4 results, noninventive, priming with 1K polyurethane (one piece of beech pretreated with Desmodur E 29, adhesive KS1)

| Storage of pretreated pieces of beech (waiting time) | Example 5 (comparative) Lap shear strength (N/mm²) Storage sequence 1 | Example 6 (comparative) Lap shear strength (N/mm²) Storage sequence 2 |
|---|---|---|
| 4 h | 0.7 | 0.5 |
| 16 h | 3.7 | 4.3 |

In the experiment with a 4 h waiting time it was found that the curing of the adhesive in this case was very slow and incomplete, because the test specimens exhibited cohesive failure with low strengths, and the residues of adhesive remaining on the substrate were still tacky. Only if a sufficiently long waiting time is observed prior to application does the curable composition KS1 undergo curing.

Example 4 (Comparative)

For comparison, the experiments were repeated without application of primer to the wood. Both beech test specimens, therefore, were unpretreated. High lap shear strengths were achieved, comparable with those achieved after a 4 h waiting time in examples 1 and 2, and higher than those after a 4 h waiting time achieved in comparative example 3.

TABLE 5 results, noninventive, without priming (KS1 applied directly to unpretreated beech)

| Storage of pretreated pieces of beech (waiting time) | Example 6 Lap shear strength (N/mm²) Storage sequence 2 | Example 7 Lap shear strength (N/mm²) Storage sequence 3 |
|---|---|---|
| Without | 3.6 | 4.3 |

Example 5 (Comparative)

As a comparison to the inventive system of polyaspartate primers (AG) and compositions based on silane-modified polymers (KS), an experiment was conducted in which, in place of the compositions based on silane-modified polymers (KS), a noninventive, moisture-curing, one-component composition based on a polyurethane prepolymer (Sikaflex Pro-1, Sika) was used in a layer structure with the primer AG1 of the invention.

For this experiment, as described above, beech test specimens were produced for the lap shear strength test (two-layer application of primer to one of the two pieces of beech, 4 h waiting time before application of Sikaflex Pro-1 to the pretreated piece of beech).

In order to rule out any possible influence from bubbling ($CO_2$), the test specimens for determining the lap shear strength were produced with a very thin bondline, in deviation from the general description above, by storing the test specimens with a pressing pressure of 0.7 $N/mm^2$ in a suitable apparatus, without small metal plates as spacers, in accordance with storage sequence 1. The lap shear strength ascertained on these test specimens was 0.6 $N/mm^2$.

Example 6 (Comparative)

On unprimed test specimens produced and stored, comparable to example 5, bonding with noninventive, curing, one-component composition based on a polyurethane prepolymer (Sikaflex Pro-1, Sika) gave a lap shear strength of 1.1 $N/mm^2$. In the case of an analogous experiment with the primer AG1 of the invention and a 4 h waiting time before, in contrast, a lap shear strength of only 0.6 $N/mm^2$ was achieved.

TABLE 6

|  | Lap shear strength SIKAFLEX PRO ($N/mm^2$) Storage sequence 1 |
| --- | --- |
| Without primer Example 6 | 1.1 (cohesive failure) |
| With AG1 primer after 4 h waiting time Example 5 | 0.6 (cohesive failure) |

It therefore emerged that with the noninventive, curing, one-component composition based on a polyurethane prepolymer, after a 4 h waiting time, with the primer of the invention, significantly poorer results were achieved, as without the priming. The presence of cohesive failure suggested a disruption to the curing of the adhesive with a short waiting time with the primer AG1.

Example 7 (Comparative)

On unprimed test specimens produced and stored, comparable to examples 5 and 6, bonding with a noninventive composition based on a curing polyvinyl acetate dispersion with metal salt crosslinker aluminum chloride gave a lap shear strength of 11.75 $N/mm^2$ (adherend failure). In the case of an analogous experiment with the primer AG1 of the invention and a 4 h waiting time before, in contrast, a lap shear strength of only 4.21 $N/mm^2$ was achieved, and adhesive failure was observed.

TABLE 7

|  | Lap shear strength Ponal, water-resistant ($N/mm^2$) Storage sequence 1 |
| --- | --- |
| Without primer Example 6 | 11.75 (cohesive failure) |
| With AG1 primer after 4 h waiting time Example 5 | 4.21 (cohesive failure) |

Here again there was a dramatic reduction in the lap shear strength of the system through the primer of the invention. In the case of the layer structure made up of primer of the invention and curing composition of the invention, this dramatic reduction was not observed.

Examples 7 and 8 show that the selection of the curable composition (KS) in a layer structure with the primer AG of the invention is not trivial, since when the primer AG is used with the noninventive curable compositions there is a significantly reduced overall strength in the system relative to the unprimed systems, and in that case the performance capacity of the curable composition cannot be fully exploited.

Example 9

Test of the Tensile Adhesivity of the Primer AG1 and SIKAFAST MR
Production and Storage of Test Specimens:

The tensile adhesivity of the primer AG1 on a concrete plate wetted beforehand was compared with that of the primer based on SIKAFAST MR (aqueous, two-component epoxy resin primer, from Sika).

The test specimen used was the upper side of Stelcon Ferubin hard concrete slabs 30×30×3 cm, BTE Stelcon Deutschland GmbH, Philippsburger Str.4, 76726 Germersheim.

These slabs were stored under standard conditions at 23 degrees Celsius and 50% relative humidity for 28 d, after which the upper side was brushed with 5% citric acid solution in water and after an exposure time of 20 min was freed from any adhering cement slurries with a brush under running water. The slab was subsequently stored in water for 7 d, taken out of the water and stored upright, allowing superficially adhering water to run off.

AG1 was then applied directly after preparation in a Speedmixer to the surface thus prepared, application taking place to the slabs using a roller (Moltopren roller) with an application weight of around 200 $g/m^2$. Thereafter the primed slabs were stored with the reverse side on plastic sheets at 23 degrees Celsius and 50% relative humidity for 16 h.

To produce an even layer thickness, the primed slabs were recoated with a self-leveling 2 component polyurethane coating based on Setathane D 1150/Desmodur VL (NCO/OH index 1.05) in a layer thickness of around 1.5 mm. The slabs were thereafter stored again for 24 h with the reverse side on plastic sheets.

The tensile adhesivity test is carried out immediately thereafter on one series of slabs (series A). A further series (series B) is placed with the reverse side into a water basin in such a way that the water surface extends around 1 cm below the primer, and is stored in this way for 28 d at 23 degrees Celsius and 50% relative humidity.

The slabs underwent analogous priming and storage, except that this time, in place of the AG1 primer, SIKAFAST MR (aqueous 2-component epoxy resin primer) prepared according to the manufacturer's instructions was used.

Determination of End-Face Removability:

The end-face removability was determined with the HP 850 adhesion testing system.

Into the upper side of the slabs produced and stored as above, three drilled cores with a diameter of around 5 cm are milled to a depth of around 5 mm into the concrete. The distance between the edges of the drilled cores was greater than 4 cm. The bond area was abraded with abrasive paper, dedusted, and degreased with acetone. The test die (circular, 50 mm diameter), cleaned beforehand, was adhered in a uniformly thin layer with lateral turning, using the 2K epoxy resin adhesive Metallon FL (Sichelwerke GmbH), ensuring that any adhesive swelling out in this case must not run into the milling groove, and must if so be removed.

After 24 h of storage at 23 degrees Celsius and 50% relative humidity, the end-face removability was ascertained, and was calculated as follows:

Dimension of the tearing force=N/mm$^2$
Area of 50 mm die=1964 mm$^2$
Read value=KN
1KN=1000N
Tensile adhesive strength=tearing force [N]: area [mm$^2$]

TABLE 8 tensile adhesive strengths of the primer before and after storage

|  | SIKA MR FAST | Primer AG1 |
|---|---|---|
| Series A | 3.6 (fracture in concrete) | 3.1 (fracture in concrete) |
| Series B | 3.1 (fracture between concrete and primer) | 2.55 (fracture between concrete and primer) |

As table 8 shows, the tensile adhesive strength of the primer AG1 is absolutely comparable with the system of the prior art and is in each case well above the 1 N/mm$^2$ required for elastic parquet adhesives in accordance with DIN EN 14293.

The invention claimed is:

1. A layer structure comprising:
a substrate;
a polyaspartate primer as a pretreatment to the substrate; and
a curable composition adhesively bonded to the polyaspartate primer, said curable composition being based on a silane-modified polymer,
wherein the polyaspartate primer consists essentially of
(i) an isocyanate component comprising a polyisocyanate, and
(ii) an amino-functional polyaspartic ester of the general formula (III),

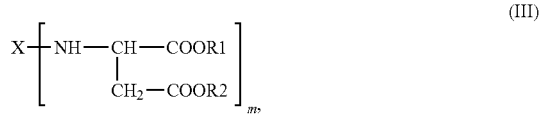

in which
X is an m-valent organic radical containing a heteroatom obtained by removal of a primary amino group from a corresponding polyamine having a molecular weight of from 60 to 6000 g/mol and containing a (cyclo) aliphatically and/or araliphatically bonded primary amino group,
R1 and R2 are identical or different organic radicals,
m is an integer>1,
and wherein the silane-modified polymer comprises an end group of the general formula (I),

in which
A is a divalent linking group comprising a heteroatom,
R is a divalent hydrocarbon radical having 1-12 carbon atoms,
V, Y, and Z are substituents on the Si atom, and independently comprise a $C_1$-$C_8$ alkyl, a $C_1$-$C_8$ alkoxy, or a $C_1$-$C_8$ acyloxy group, wherein at least one of V, Y, and Z is a $C_1$-$C_8$ alkoxy or a $C_1$-$C_8$ acyloxy group, and
n is 0 or 1,
wherein the polyisocyanate comprises: 1,4-butane diisocyanate, 1,5-pentane diisocyanate, 1,6-hexane diisocyanate, 4-isocyanatomethyl-1,8-octane diisocyanate, 4,4'-methylenebis(cyclohexyl isocyanate), 3,5,5-trimethyl-1-isocyanato-3-isocyanatomethylcyclohexane, 1,3-bis(isocyaanatomethyl)cyclohexane, 1,4-bis(isocyanatomethyl)cyclohexane, 1,5-naphthalene diisocyanate, a diisocyanatodiphenylmethane comprising 2,2'-diphenylmethane diisocyanate, 2,4'-diphenylmethane diisocyanate, 4,4'-diphenylmethane diisocyanate, or a mixture thereof, a diisocyanatomethylbenzene comprising 2,4-tolylene diisocyanate, 2,6-toylene diisocyanate, or a mixture thereof, 1,3-bis(isocyanatomethyl)benzene, 1,4-bis(isocyanatomethyl)benzene, 3,3'-dimethyl-4,4'-biphenyl diisocyanate, 1,4-paraphenylene diisocyanate, 1,3-tetramethylxylylene diisocyanates, or cyclohexyl diisocyanate.

2. The layer structure as claimed in claim 1, wherein the polyaspartate primer consists essentially of
(i) the isocyanate component comprising a polyisocyanate based on aliphatic and/or cycloaliphatic diisocyanates,
(ii) the amino-functional polyaspartic ester of the general formula (III)

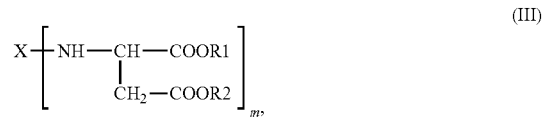

in which
X is an m-valent organic radical which is obtained by removal of all amino groups from a polyamine selected from the group consisting of 1-amino-3,3,5-trimethyl-5-aminomethylcyclohexane, 2,4-hexahydrotolylenediamine, 2,6-hexahydrotolylenediamine, 2,4'-diaminodicyclohexylmethane, 4,4'-diaminodicyclohexylmethane, 3,3'-dimethyl-4,4'-diaminodicyclohexylmethane, 2,4,4'-triamino-5-methyldicyclohexylmethane, and mixtures thereof, and
R1 and R2 independently of one another are a methyl group or an ethyl group,
and wherein the silane-modified polymer comprises an end group of the general formula (I),

in which

A is an oxygen atom or a group —NR'—, in which R'
is an H atom, an alkyl radical having 1 to 12 C atoms,
an aryl radical having 1 to 12 C atoms, an amide, a
carbamate, a urea, an imino, a carboxylate, a carbamoyl, an amidino, a carbonate, a sulfonate or a
sulfinate group, R is a divalent hydrocarbon radical having 1-6 carbon
atoms, V, Y, and Z are substituents on the Si atom and
independently of one another are a methyl, ethyl,
methoxy or ethoxy group, wherein at least one of V,
Y and Z is a methoxy or ethoxy group, n is 0 or 1.

3. The layer structure as claimed in claim 1, wherein the polyaspartate primer consists essentially of
(i) the isocyanate component comprising a polyisocyanate which is a derivative of hexamethylene diisocyanate, pentamethylene diisocyanate, or both,
(ii) the amino-functionalpolyaspartic ester of the general formula (III)

in which

X is an m-valent organic radical which is obtained by removal of all amino groups from a polyamine selected from the group consisting of 1-amino-3,3,5-trimethyl-5-aminomethylcyclohexane, 2,4-hexahydrotolylenediamine, 2,6-hexahydrotolylenediamine, 2,4'-diaminodicyclohexylmethane, 4,4'-diaminodicyclohexylmethane, 3,3'-dimethyl-4,4'-diaminodicyclohexylmethane, 2,4,4'-triamino-5-methyldicyclohexylmethane, and mixtures thereof, and R1 and R2 independently of one another are a methyl group or an ethyl group, and wherein the silane-modified polymer comprises an end group of the general formula (I), -$A_n$-R-SiVYZ    (I), in which A is an oxygen atom or a group —NR'—, in which R' is an H atom, an alkyl radical having 1 to 12 C atoms, an aryl radical having 1 to 12 C atoms, an amide, a carbamate, a urea, an imino, a carboxylate, a carbamoyl, an amidino, a carbonate, a sulfonate, or a sulfinate group, R is a divalent hydrocarbon radical having 1-6 carbon atoms, V, Y, and Z are substituents on the Si atom and independently of one another are a methyl or methoxy group, where at least one of V, Y or Z is a methoxy group, n is 0 or 1.

4. The layer structure as claimed in claim 1, wherein the polyaspartate primer consists essentially of
(i) the isocyanate component comprising a polyisocyanate which is a derivative of hexamethylene diisocyanate, pentamethylene diisocyanate, or both,
(ii) the amino-functionalpolyaspartic ester of the general formula (III)

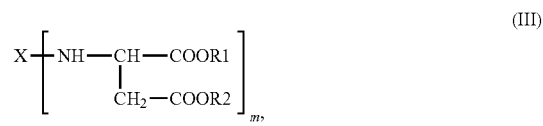

in which

X is an m-valent organic radical which is obtained by removal of all amino groups from a polyamine selected from the group consisting of 1-amino-3,3,5-trimethyl-5-aminomethylcyclohexane, 2,4-hexahydrotolylenediamine, 2,6-hexahydrotolylenediamine, 2,4'-diaminodicyclohexylmethane, 4,4'-diaminodicyclohexylmethane, 3,3'-dimethyl-4,4'-diaminodicyclohexylmethane, 2,4,4'-triamino-5-methyldicyclohexylmethane, and mixtures thereof, and R1 and R2 independently of one another are a methyl group or an ethyl group, and wherein the silane-modified polymer comprises an end group of the general formula (I), -$A_n$-R-SiVYZ    (I), in which A is an oxygen atom or a group —NR'—, in which R' is an H atom, an alkyl having 1 to 12 C atoms, an aryl radical having 1 to 12 C atoms, an amide, a carbamate, a urea, an imino, a carboxylate, a carbamoyl, an amidino, a carbonate, a sulfonate, or a sulfinate group, R is a divalent hydrocarbon radical having 1-6 carbon atoms, V, Y, and Z are substituents on the Si atom, where V is an alkyl group and Y and Z independently of one another are an alkoxy group, and n is 0 or 1.

5. The layer structure as claimed in claim 1, wherein the polyaspartate primer has a mass fraction of more than 85% of
(i) the isocyanate component comprising a polyisocyanate, and
(ii) the amino-functional polyaspartic ester of the general formula (III).

6. A method for adhesively bonding floor coverings to pretreated substrates comprising applying a polyaspartate primer as pretreatment to a substrate and subsequently adhesively bonding the floor covering to the pretreated substrate to bond the floor covering to the pretreated substrate, wherein the polyaspartate primer consists essentially of
(i) an isocyanate component comprising a polyisocyanate, and
(ii) an amino-functional polyaspartic ester of the general formula (III),

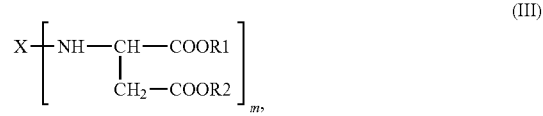

in which

X is an m-valent organic radical containing a heteroatom obtained by removal of a primary amino group from a corresponding polyamine having a molecular weight of from 60 to 6000 g/mol and containing a (cyclo) aliphatically and/or araliphatically bonded primary amino group, R1 and R2 are identical or different organic radicals, m is an integer>1, and wherein the floor covering comprises a silane-modified polymer comprising an end group of the general formula (I), $$-A_n\text{-R-SiVYZ} \qquad (I),$$

in which

A is a divalent linking group comprising a heteroatom,

R is a divalent hydrocarbon radical having 1-12 carbon atoms,

V, Y, and Z are substituents on the Si atom, and independently comprise a $C_1$-$C_8$ alkyl, a $C_1$-$C_8$ alkoxy, or a $C_1$-$C_8$ acyloxy group, wherein at least one of V, Y, and Z is a $C_1$-$C_8$ alkoxy or a $C_1$-$C_8$ acyloxy group, and n is 0 or 1, wherein the floor covering comprises a curable composition applied between 1-72 h after applying the polyaspartate primer.

7. The method as claimed in claim 6, comprising applying the polyaspartate primer as a single layer.

8. A kit comprising:

a polyaspartate primer configured as pretreatment to a substrate; and a curable composition based on a silane-modified polymer, the curable composition configured to adhesively bond to the pretreated substrate, wherein the polyaspartate primer consists essentially of (i) an isocyanate component comprising a polyisocyanate, and (ii) an amino-functional polyaspartic ester of the general formula (III),

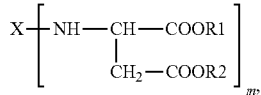
(III)

in which

X is an m-valent organic radical containing a heteroatom obtained by removal of a primary amino group from a corresponding polyamine having a molecular weight of from 60 to 6000 g/mol and containing a (cyclo) aliphatically and/or araliphatically bonded primary amino group, R1 and R2 are identical or different organic radicals, m is an integer>1, and wherein the silane-modified polymer comprises an end group of the general formula (I), $$-A_n\text{-R-SiVYZ} \qquad (I),$$

in which

A is a divalent linking group comprising a heteroatom,

R is a divalent hydrocarbon radical having 1-12 carbon atoms,

V, Y, and Z are substituents on the Si atom, and independently comprise a $C_1$-$C_8$ alkyl, a $C_1$-$C_8$ alkoxy, or a $C_1$-$C_8$ acyloxy group, wherein at least one of V, Y, and Z is a $C_1$-$C_8$ alkoxy or a $C_1$-$C_8$ acyloxy group, and n is 0 or 1, wherein the polyisocyanate comprises: 1,4-butane diisocyanate, 1,5-pentane diisocyanate, 1,6-hexane diisocyanate, 4-isocyanatomethyl-1,8-octane diisocyanate, 4,4'-methylenebis(cyclohexyl isocyanate), 3,5,5-trimethyl-1-isocyanato-3-isocyanatomethylcyclohexane, 1,3-bis(isocyanatomethyl)cyclohexane, 1,4-bis(isocyanatomethyl)cyclohexane, 1,5-naphthalene diisocyanate, a diisocyanatodiphenylmethane comprising 2,2'-diphenylmethane diisocyanate, 2,4'-diphenylmethane diisocyanate, 4,4'-diphenylmethane diisocyanate, or a mixture thereof, a diisocyanatomethylbenzene comprising 2,4-tolylene diisocyanate, 2,6-toylene diisocyanate, or a mixture thereof, 1,3-bis(isocyanatomethyl)benzene, 1,4-bis(isocyanatomethyl)benzene, 3,3'-dimethyl-4,4'-biphenyl diisocyanate, 1,4-paraphenylene diisocyanate, 1,3-tetramethylxylylene diisocyanates, or cyclohexyl diisocyanate.

* * * * *